United States Patent [19]

Juan, Sung Y.

[11] Patent Number: 5,048,994
[45] Date of Patent: Sep. 17, 1991

[54] CONNECTOR FOR ROLL BARS OF A TRUCK

[76] Inventor: Juan, Sung Y., No. 8, Alley 14, Lane 151, Sec. 2, Chung Shan Rd., Shu Lin Chen, Taipei Hsien, Taiwan

[21] Appl. No.: 601,363

[22] Filed: Oct. 23, 1990

[51] Int. Cl.⁵ .............................................. F16B 7/10
[52] U.S. Cl. ........................................ 403/51; 403/24; 403/174; 403/191; 403/288; 280/752
[58] Field of Search ................. 280/756; 403/174, 178, 403/191, 235, 24, 288, 51

[56] References Cited

U.S. PATENT DOCUMENTS

| | | | |
|---|---|---|---|
| 1,249,848 | 12/1917 | Sprague | 403/191 X |
| 2,392,110 | 1/1946 | Alexander | 403/191 X |
| 2,583,368 | 1/1952 | French | 403/178 |
| 4,171,141 | 10/1979 | Hobrecht | 280/756 |

FOREIGN PATENT DOCUMENTS 2616182 12/1988 France ...................... 280/756

Primary Examiner—Andrew V. Kundrat
Attorney, Agent, or Firm—Bacon & Thomas

[57] ABSTRACT

An improved connector comprises a coupling sleeve, a cylindrical connecting block, and a bellows hose. The coupling sleeve has a base member on its outer surface. The base member has an annular ring and an engaging pin protruding from the base member, the end of which is formed as a wheel-shape disk. The connecting block is provided with a receiving hole, an annular ring, and a peripheral flange.

1 Claim, 3 Drawing Sheets

CONNECTOR FOR ROLL BARS OF A TRUCK

BACKGROUND OF THE INVENTION

The present invention relates to an improved connector for connecting roll bars to a vehicle. Roll bars are used in a vehicle to prevent the roof panel from collapsing, thus protecting the driver in the event of an accident. They are made especially for jeeps or pickups.

By convention, roll bars comprise a U-shape main bar and a plurality of supporting bars. These bars are typically welded together. The U-shape main bar is attached at the back of the cab and its height is usually slightly higher than that of the cab.

Because there are so many different sizes of jeeps and the vans, roll bars must be designed for each. It would be difficult to exchange roll bars when from vehicles of different size.

In addition to not being interchangeable, the U-shape of the main bars makes shipment of the bars difficult. Also U-shaped bars require more storage space.

SUMMARY OF THE INVENTION

Traditional roll bars are welded together, specially made upon request. Thus these roll bars are not interchangeable.

The present invention provides an improved connector which allows the bars to be adjusted so as to be suitable for different models of vehicle. The improved connector, in accordance with the present invention, comprises a special coupling sleeve for carrying the transverse bar and side bar, a connecting block for receiving the supporting bar and linking the coupling sleeve, and a bellows for engaging with the coupling sleeve and connecting block to prevent the connector junction from dirt.

It is the purpose of this present invention, therefore, to mitigate and/or obviate the above-mentioned drawback in the manner set forth in the detailed description of the preferred embodiment.

DETAILED DESCRIPTION OF THE PREFERRED EMBODIMENT

Figure 4:
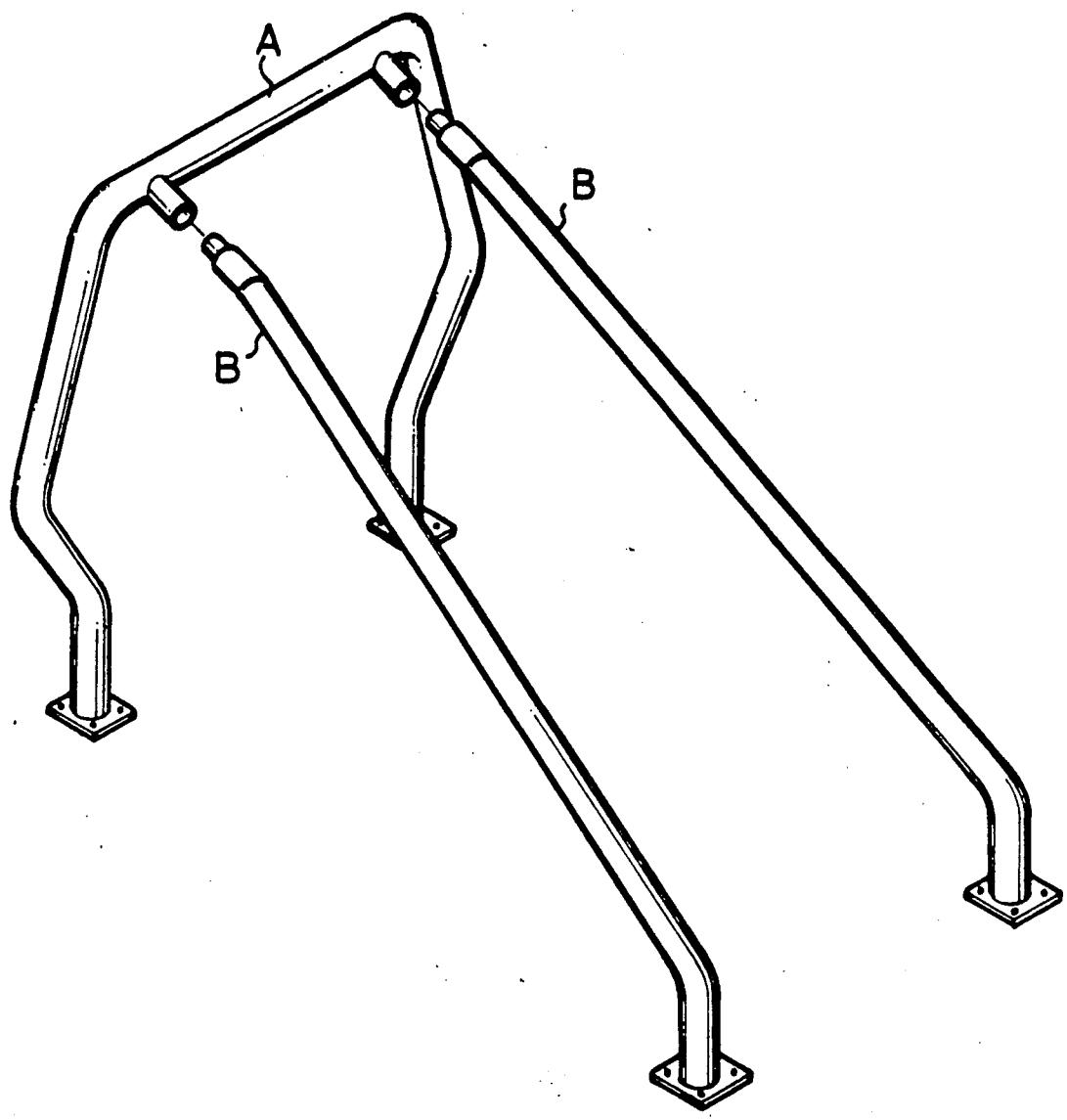
FIG. 4 is an exploded view showing a conventional roll bar.

Referring to FIG. 4, a conventional roll bar comprises a transverse U-shape main bar A with two receptacles, and a pair of supporting bar B. The main bar and the supporting bars are connected by means of welding or riveting.

Figure 3:
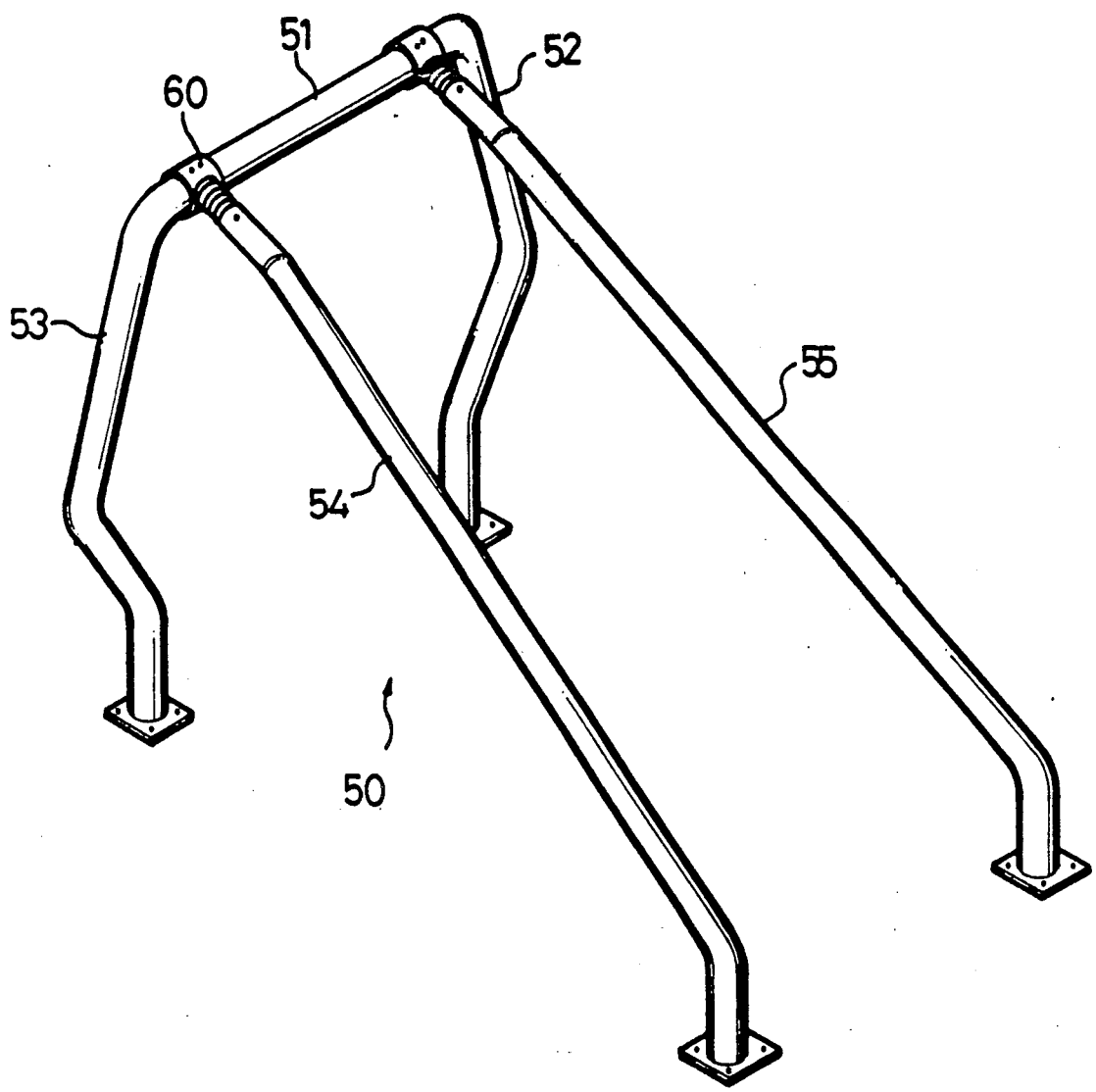
FIG. 3 is a perspective view of a roll bar connected with the connector in accordance with the present invention.

Referring to FIG. 3, a roll bar 50 constructed with improved connectors, in accordance with the present invention, comprises a straight transverse main bar 51, a pair of side bars 52 and 53, and a pair of supporting bars 54 and 55. The length of the transverse bar 51 can be cut to suit vehicle width, and the supporting bars can be adjusted to attach to either the wheel cover or rear floor panel as desired. The preferred embodiment of an improved connector, in accordance with the present invention, is described as follows.

Figure 1:
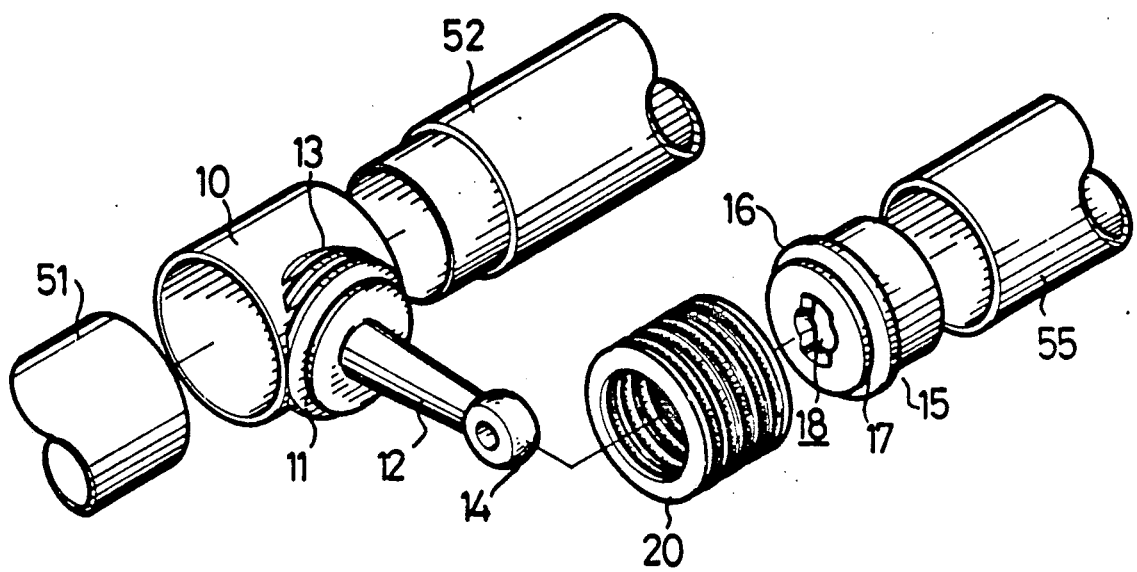
FIG. 1 is an exploded view showing a connector in accordance with the present invention.

Illustrated in FIG. 1 are components of an improved connector. The connector provides a coupling sleeve 10 which connects with the transverse bar 51 and the side bar 52. The side bar 52 has a reduced end which is inserted into the end of the main bar 51, and the joint of the bars 51 and 52 is positioned in the coupling sleeve 10.

A cylindrical base member 13 is perpendicularly attached to an outer surface of the coupling sleeve 10, the base member 13 provided with an annular ring 11 on the end surface thereof and an engaging pin 12 extending from its end surface. The end of the pin 12 has been formed into a wheel-shape disk 14 to link with a connecting block 15.

Still referring to FIG. 1, the connector provides a cylindrical connecting block 15 to link the coupling sleeve 10 and the supporting bar 55. The connecting block 15 has a peripheral flange 16 on its outer wall. When the connecting block is inserted into an end of the supporting bar, the peripheral flange 16 functions as a stop which abuts the rim of the supporting bar 55. Further, the connecting block 15 provides a second annular ring 17 and a corresponding quadrate receiving hole 18 on its end surface to receive the wheel-shape disk 15.

Figure 2:
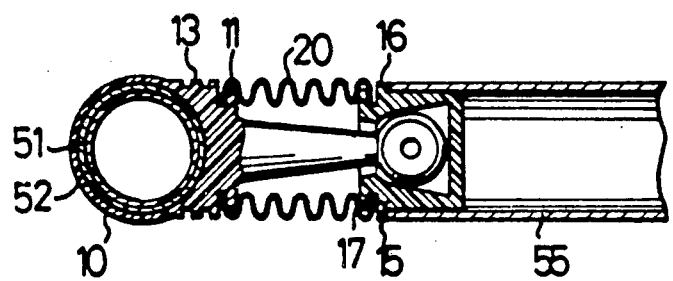
FIG. 2 is a side elevation cross-sectional view of FIG. 1 wherein all components have been assembled.

The connector, in accordance with the invention, further provides a bellows hose 20. The engaging pin 12 is inserted into the receiving hole 18 of the connecting block 15 through the bellows hose 20. The bellows hose 20 is engaged to the first and second annular rings 11 and 17 to protect the connector junction against dirt. After insertion, the connecting block 15 is turned around to abut the longitudinal rim of the quadrate receiving hole 18 against the wheel-shape disk 14, and the supporting bar 55 is engaged to the connecting block 15, as shown in FIG. 2, such that the supporting bars 54 and 55 can be adjusted to a desired orientation.

Further, the connector, in accordance with the present invention, can be fixed to the roll bar with rivets 60, as shown in FIG. 3.

It is to be understood, however, that even though numerous characteristics and advantages of the present invention have been set forth in the foregoing description, together with details of the structure and function of the invention, the disclosure is illustrative only, and changes may be made in its details, especially in matters of shape, size, and arrangement of parts, without violating the scope of the invention as set forth within broader general meaning of the appended claims are expressed.

I claim:

1. An improved connector for connecting roll bars used on a vehicle comprising substantially one or more transverse bars, side bars, and supporting bars interconnected to one another and fixedly secured to a floor of the vehicle at one end, said connector comprising:

a coupling sleeve for connecting the transverse bar and the side bar by virtue of having a connecting base member, said base member providing a first annular ring and an engaging pin extending from its end surface formed into a wheel-shape disk;

a cylindrical connecting block providing a peripheral flange along its outer wall to abut a supporting bar when said connecting block is inserted into the supporting bar, an end of said connecting block being provided with a second annular ring and a receiving hole; and a bellows hose for engaging said annular rings when said wheel-shape disk is inserted into said receiving hole and said connecting block is turned around to fixedly connect said coupling sleeve and said connecting block.

* * * * *